US007750648B2

(12) United States Patent
Foreman et al.

(10) Patent No.: US 7,750,648 B2
(45) Date of Patent: Jul. 6, 2010

(54) METHOD TO QUICKLY ESTIMATE INDUCTANCE FOR TIMING MODELS

(75) Inventors: Eric A. Foreman, Fairfax, VT (US);
Peter A. Habitz, Hinesburg, VT (US);
Mark R. Lasher, Colchester, VT (US);
William J. Livingstone, Underhill, VT (US); Gregory M. Schaeffer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 12/059,275

(22) Filed: Mar. 31, 2008

(65) Prior Publication Data

US 2009/0243630 A1 Oct. 1, 2009

(51) Int. Cl.
*G01R 27/00* (2006.01)
(52) U.S. Cl. ...................................... 324/677; 324/654
(58) Field of Classification Search ................ 324/654, 324/600, 677
See application file for complete search history.

(56) References Cited

U.S. PATENT DOCUMENTS

2007/0103123 A1* 5/2007 DeVore ...................... 323/208

OTHER PUBLICATIONS

Ligocka, A. et al., "Effect of inductance on interconnect propagation delay in VLSI circuits", Signal Propagation on Interconnects, 2004. Proceedings. 8th IEEE Workshop, May 2004, pp. 121-124.

* cited by examiner

*Primary Examiner*—Vincent Q Nguyen
(74) *Attorney, Agent, or Firm*—Ryan K. Simmons; Roberts Mlotkowski Safran & Coie, P.C

(57) ABSTRACT

A method of estimating an inductance delay includes determining a resistance-capacitance (RC) delay with resistances and capacitances of a network and estimating an inductance delay of the network by determining a propagation delay of an electromagnetic (EM) field across wires of the network. Additionally, the method includes determining if the RC delay is below a specified threshold and adding the estimated inductance delay to the RC delay to determine a total time to propagate voltage swings through the network if the RC delay is below the specified threshold.

9 Claims, 3 Drawing Sheets

METHOD TO QUICKLY ESTIMATE INDUCTANCE FOR TIMING MODELS

FIELD OF THE INVENTION

The present invention generally relates to a method for quickly estimating inductance, and more particularly, to a method for quickly estimating inductance using a propagation delay of an electromagnetic (EM) field across a network of wires.

BACKGROUND OF THE INVENTION

Calculating the effect of inductance on the time required to propagate voltage swings through the interconnect wiring of an integrated circuit is complex and time consuming. For example, return paths are required to accurately model the inductive effects. Moreover, extraction of inductance on large designs is difficult, time consuming and memory intensive. As such, inductance extraction is often ignored. However, with technologies getting faster and frequencies increasing, ignoring the effect of inductance may lead to inaccuracies, and can lead to incorrect results.

Accordingly, there exists a need in the art to overcome the deficiencies and limitations described hereinabove, to provide a fast estimate of the effect of inductance on timing.

SUMMARY OF THE INVENTION

In a first aspect of the invention, a method of estimating an inductance delay comprises determining a resistance-capacitance (RC) delay with resistances and capacitances of a network and estimating an inductance delay of the network by determining a propagation delay of an electromagnetic (EM) field across wires of the network. The method further comprises determining if the estimated inductance delay should be added to the RC delay and if the determining indicates the estimated inductance delay should be added to the RC delay, adding the estimated inductance delay to the RC delay to determine a total time to propagate voltage swings through the network.

In a further aspect of the invention, a method of estimating an inductance delay comprises determining a resistance-capacitance (RC) delay with resistances and capacitances of a network by building a parasitic model of capacitors and resistors of the network. Additionally, the method comprises estimating an inductance delay of the network by determining a propagation delay of an electromagnetic (EM) field across wires of the network by determining a total wire length of the network and dividing the total wire length of the network by the speed of light in a chip dielectric. Further, the method comprises determining if the estimated inductance delay should be added to the RC delay, and if the determining indicates the estimated inductance delay should be added to the RC delay, adding the estimated inductance delay to the RC delay to determine a total time to propagate voltage swings through the network according to one of the equations:

Delay at $1/e$ voltage = $RC$ + (length of wire)/$c$, and

Delay at $\frac{1}{2}$ voltage = $0.7 \times (RC + $ (length of wire)/$c)$, wherein $e$ is the base of the natural logarithm, R is resistance, C is capacitance and c is the speed of light in the chip dielectric.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The present invention generally relates to a method for quickly estimating inductance, and more particularly, to a method for quickly estimating inductance using a propagation delay of an electromagnetic (EM) field across a network of wires.

Figure 1:
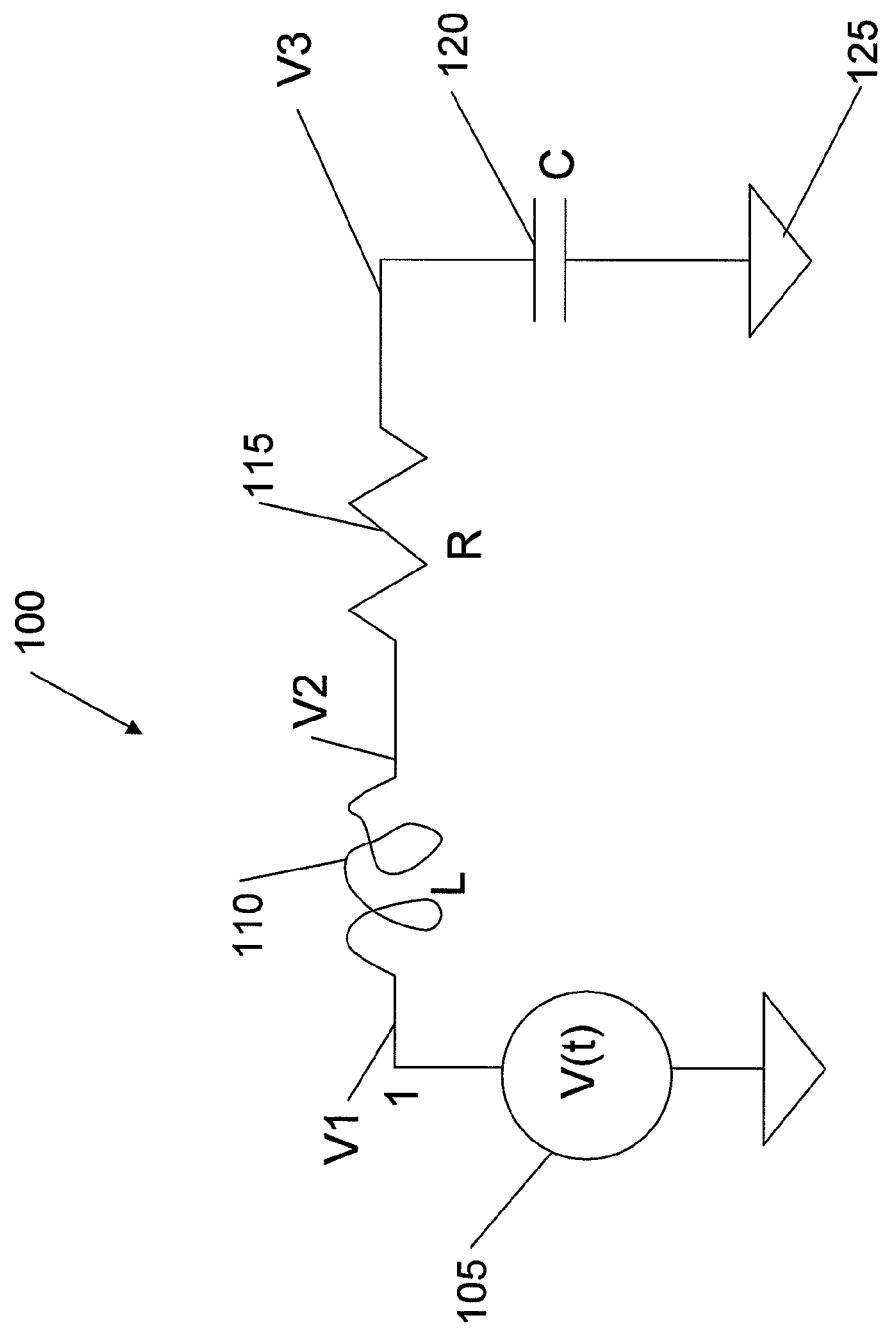
FIG. 1 shows an RLC model according to an aspect of the present invention.

FIG. 1 shows a simple RLC circuit 100, which includes a voltage source 105, an inductor 110, a resistor 115 and a capacitor 120 in series. The capacitor 120 is connected to ground 125. Additionally, FIG. 1 shows a voltage V1 before the inductor, a voltage V2 between the inductor 110 and the resistor 115 and a voltage V3 between the resistor 115 and the capacitor 120.

Figure 2:
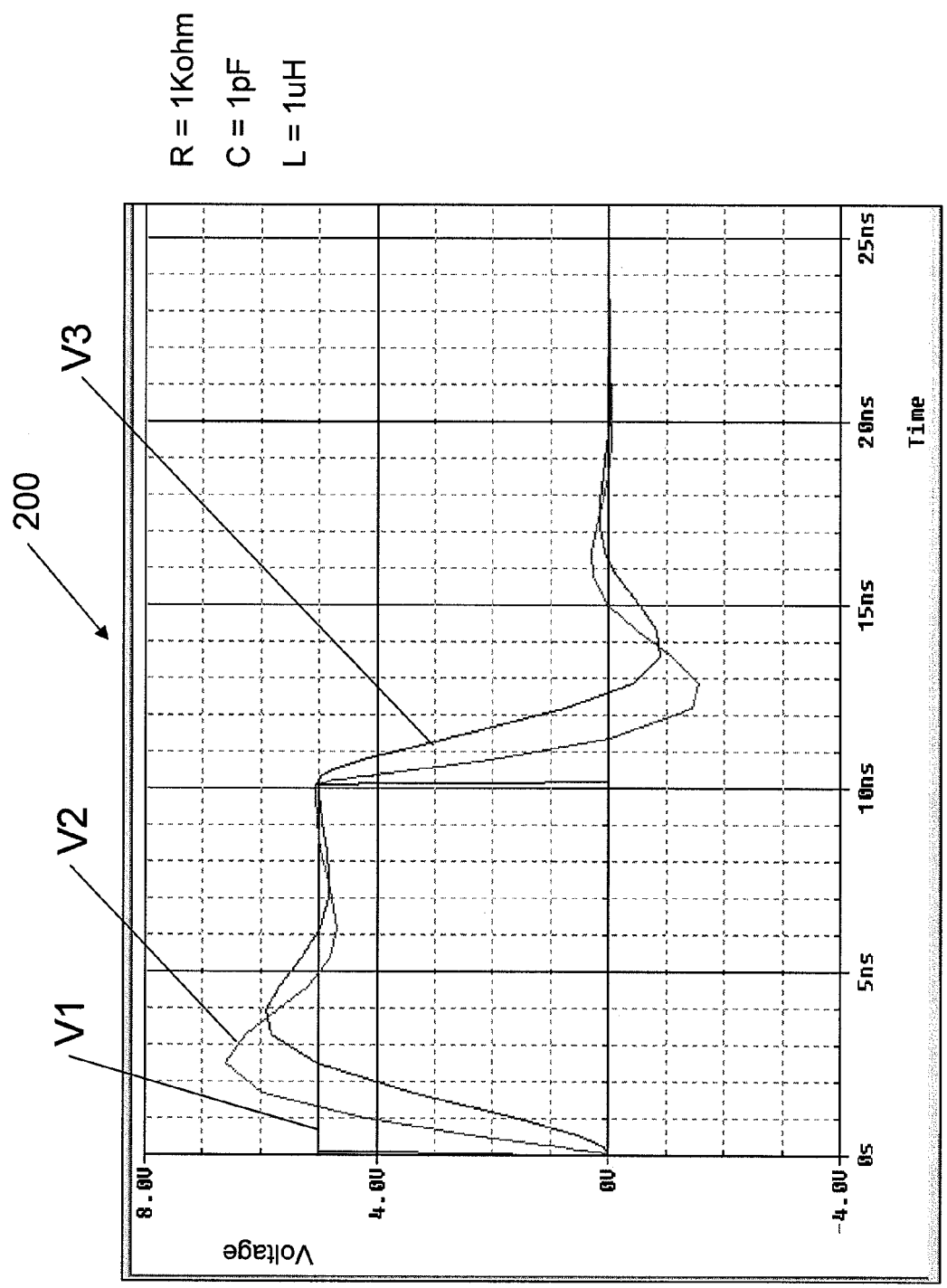
FIG. 2 shows an exemplary spice result according to an aspect of the invention.

FIG. 2 shows a spice result 200 as a plot of voltage versus time indicating a propagation delay through the simple RLC circuit 100 when a voltage ramp is applied to the simple RLC circuit 100. With this exemplary spice result 200, the inductor 110 has an inductance of 1 u henry, the resistor 115 has a resistance of 1000 Ohms and the capacitor 120 has a capacitance of 1 picofarad.

As shown in FIG. 2, a voltage V1 is ramped from zero volts to five volts in 0.1 ns. However, as shown in FIG. 2, the voltage V2 at the resistor 115 is delayed due to an inductance delay through the inductor 110. Additionally, the voltage V3 at the capacitor 120 is delayed due to the RC delay.

Thus, as shown in FIG. 2, the spice result 200 indicates that the overall delay through the RLC circuit 100 is due to two components: the inductance delay indicated by curve V2, and the RC delay indicated by curve V3. For example, with an applied voltage at four volts, curve V1 indicates approximately a 0.1 ns delay due to the ramping up of the voltage. Additionally, curve V2 indicates a delay of approximately 1.0 ns due to inductance delay and curve V3 indicates a delay of approximately 1.0 ns due to RC delay. Thus, with an applied voltage of 4 volts, the simple RLC circuit 100 has a total voltage propagation delay of approximately 2.0 ns.

As a further example, as shown in FIG. 2, the applied voltage V1 has ramped down at approximately 10 ns. Thus, as shown, with an applied voltage V1 of 1 volt, voltage at the resistor V2 is delayed approximately 1.0 ns and the voltage at the capacitor V3 is delayed approximately 1.0 ns. Thus, with an applied voltage of 1 volt, the simple RLC circuit 100 has a total voltage propagation delay of approximately 2.0 ns.

Thus, as exemplified in FIG. 2, the overall voltage propagation delay through a circuit may be due to two components: an inductance (LC) delay and an RC delay. Moreover, while the RC delay may be easily determined using convention techniques, a calculation of the inductance delay may be a difficult and expensive process.

Thus, according to an aspect of the invention, the inductance delay may be estimated as described further below. As the present invention involves a first order estimation of the inductance delay, it should be understood that the estimation may not be as accurate as an actual calculation of the inductance delay. The accuracy of the inductance estimation of the present invention can be understood out of a comparison with an inductance calculation method. First, the instant invention assumes that sqrt(LC)=1/c, wherein L is the inductance, C is the capacitance and c is the speed of light. However, this assumption is true only for transmission lines and this assumes that the capacitance is between the signal lines and the return path wires only. That is, this assumption is true for a co-axial cable shielded signal. While the signal wires of a circuit are not co-axial shielded signal lines, the assumption is valid and useful because signal wires of a circuit are also shielded signal lines. Furthermore, the instant invention assumes that other networks making the capacitance are part of a return path. However, this may not be the case. Consequently, in instances, the estimated inductance may be too small.

Additionally, using the inductance estimation method of the instant invention assumes that the RC (resistance-capacitance) is large enough to dampen the oscillation from the LC (inductance-capacitance) network, such that the LC oscillation never gets twice through the switch point of the down stream cell. This enables an estimation of the delay component without having to check the resulting wave form. Moreover, this indicates that the instant invention is an estimated correction to the RC delay, not a method to calculate an inductance delay of an RLC network.

Furthermore, the inductance estimation method of the instant invention also provides only the high frequency inductance limit. Therefore, with any slew rate smaller than infinity, the inductance value should be smaller. Also, the inductance estimation method of the instant invention does not include the reduction of inductance with wire length.

Combining all of these above-noted inaccuracies, indicates that the present invention provides a simple first order estimation of inductance and not an accurate calculation of inductance. The present invention avoids wire delays faster than the speed of light and moves the overall propagation delay into the correct range.

According to an aspect of the invention, the effect of inductance on the amount of time required for a voltage swing to propagate, through interconnect wiring, from the output of an FET transistor (A) to the input gate of a downstream FET transistor (B) may be estimated. Additionally, in order to estimate the total signal delay, the estimated inductance delay may be added to the determined RC delay.

According to an aspect of the invention, the inductance delay may be estimated by assuming that the electromagnetic (EM) field will propagate from (A) to (B) at the speed of light. For very fast paths from (A) to (B), the inductive effect is significant and should not be ignored. This additional amount of time for the EM field to propagate from (A) to (B) at the speed of light may then added to the determined RC delay, to determine the total time required to propagate voltage swing through the circuit.

In embodiments, the interconnecting wires from each input gate of an FET transistor (B), back to the output of the driving FET transistor (A) may be traversed. That is, the network of segments and pins may be traversed and the resistances and capacitance for the segments and pins may be reported.

While traversing each path, a parasitic model of capacitors and resistors may be built. The building of a parasitic model of capacitors and resistors is performed in a conventional manner. As such, a further description of this process is not necessary for one skilled in the art to practice this particular step.

Additionally, the distance traveled may be accumulated by, e.g., keeping a running tally of segment lengths for each of the source pin to sink pin combinations and the wiring layers used. For example, the total actual wire length may be determined from the geometry of the circuit layout. As discussed further below, the total wire length may be used to accurately calculate the speed of light variability through the metal segment lengths of wire based on the wire's dielectric value. For example, in a dielectric, e.g., silicon dioxide, wire environment, the speed of light is approximately 7 picoseconds per millimeter of wire length.

After completion of the traversal, the RC delay from A to B (without inductive effects considered) may be determined. According to an aspect of the invention, an RC delay filter may be used, such that, if the RC delay is slower than (or above) a specified threshold, then the estimated inductance delay, or the time required for the electromagnetic field to propagate from A to B, may be ignored. On the other hand, if the RC delay is faster than (or below) a specified threshold value, the inductance delay may be estimated by determining the time required for the electromagnetic field to propagate from A to B. Additionally, in embodiments, a wire length filter may be used, such that if the determined wire length is less than a minimum wire length, the estimated inductance delay may not be added to the determined RC delay. Thus, for example, an RC delay filter may use a value of 20 picoseconds/mm and a length filter may require length of wire to be greater than, e.g., 1 mm. Thus, with an RC delay of less than 20 picoseconds/mm and a wire length of greater than 1 mm, the estimated inductance delay may be determined, as set forth below, and added to the RC delay.

Additionally, in embodiments, a shielded net filter may be used to determine the time required to propagate voltage swings. With this embodiment, a delay adder for all the shielded wires may be used regardless of wire length and determined RC delay.

When traversal is complete, a new element in the spice deck may be written out, for each sink pin, to represent the additional delay component (delta-delay). A timing tool may use the delay component, when calculating the speed of light delay through the segments, to add to the overall propagation delay though the network.

More specifically, in the first order, the speed of light in a chip dielectric c may be used to estimate the wire delay, according to the following equation, which can be added to the RC delay at 1/e voltage:

$$1/c = (LC)^{1/2} \qquad (1)$$

where L=inductance, C=capacitance, and c=the speed of light in a chip dielectric. According to the invention, this simulation supports the model according to the following equations:

$$\text{Delay at } 1/e \text{ voltage} = RC + (\text{length of wire})/c \qquad (2)$$

$$\text{Delay at } \tfrac{1}{2} \text{ voltage} = 0.7 \times (RC + (\text{length of wire})/c) \qquad (3)$$

where e is the base of the natural logarithm. According to an aspect of the invention, this additional estimated inductance delay component may be calculated based on the total length of wire of the circuit determined from the previous step. Moreover, this additional delay component is an estimated inductance delay that may be added to the determined RC delay to determine the total time required for the signal to propagate from (A) to (B).

Flow Diagram

Figure 3:
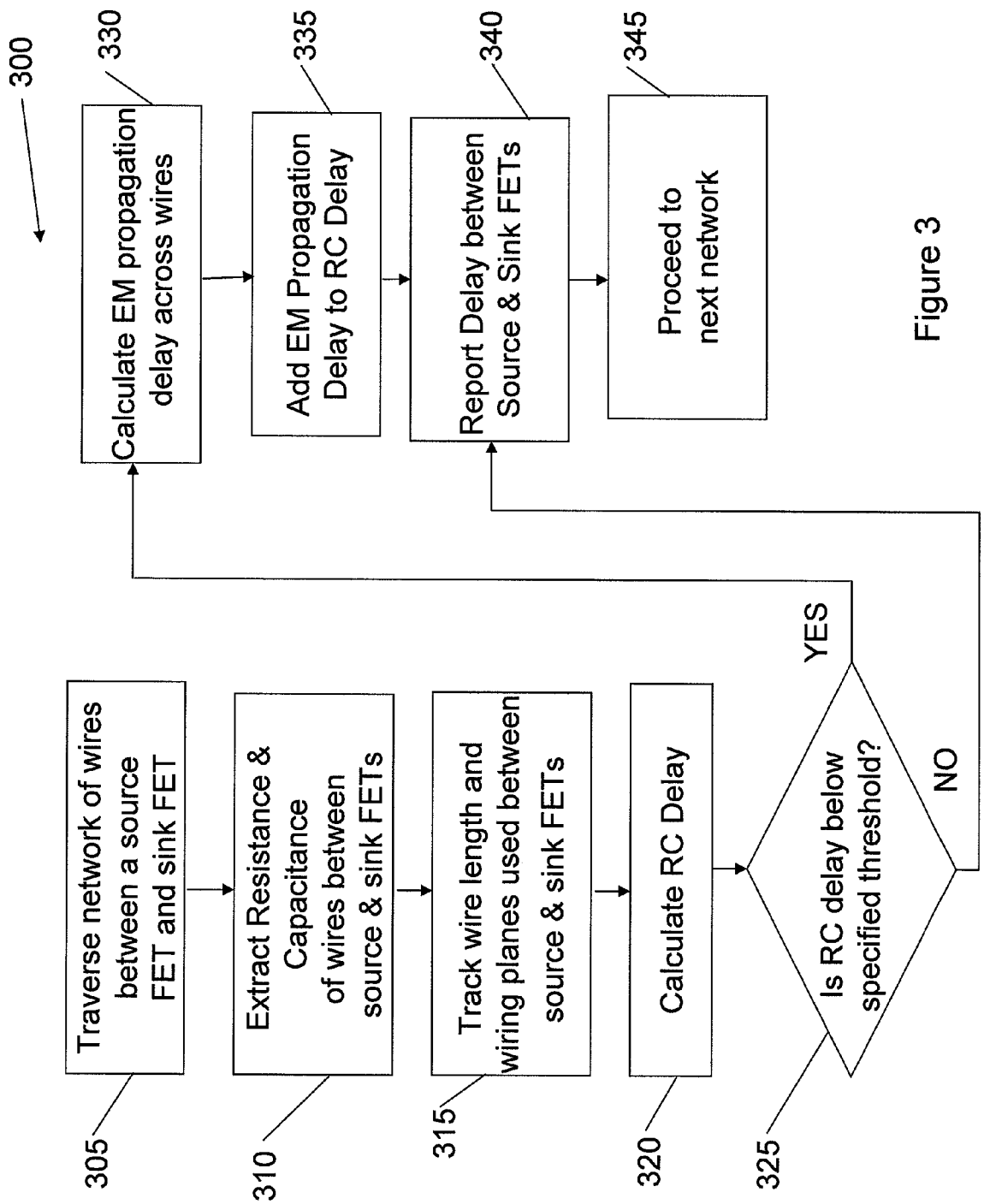
FIG. 3 shows an exemplary flow diagram according to an aspect of the invention.

FIG. 3 shows an exemplary flow 300 in accordance with the present invention. FIG. 3 may equally represent a high-level block diagram of components of the invention implementing the steps thereof. The steps of FIG. 3 may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

At step 305, a network of wires between a source FET and a sink FET is traversed. At step 310, the resistance and capacitance of wires between a source FET and a sink FET is extracted. At step 315, the wire length and wiring planes used between the source FET and the sink FET is tracked. At step 320, the RC delay is determined.

At step 325, using an RC delay filter, it is determined whether the RC delay is below a specified threshold. If, at step 325, it is determined that the RC delay is below the specified threshold, at step 330, an electromagnetic (EM) field propagation delay across the wires is determined. At step 335, the determined EM propagation delay is added to the RC delay. At step 340, the delay between the source FET and the sink FET is reported.

If, at step 325, it is determined that the RC delay is not below the specified threshold, the inductance delay may be ignored and the delay due to the EM propagation need not be determined, and the process continues at step 340. At step 345, the analysis proceeds to a next network.

It should be understood, that while the steps have been described as occurring in a particular order, the invention contemplates that the steps may be performed in other orders. For example, step 315 may be performed after step 320. Furthermore, the invention contemplates that, in embodiments, steps may be implied or omitted while still remaining true to this invention.

While the invention has been described in terms of embodiments, those of skill in the art will recognize that the invention can be practiced with modifications and in the spirit and scope of the appended claims.

What is claimed is:

1. A method of estimating an inductance delay comprising:
    calculating a resistance-capacitance (RC) delay with resistances and capacitances of a network;
    estimating an inductance delay of the network by determining a propagation delay of an electromagnetic (EM) field across wires of the network;
    determining if the estimated inductance delay should be added to the RC delay; and
    if the determining indicates the estimated inductance delay should be added to the RC delay, adding the estimated inductance delay to the RC delay to determine a total time to propagate voltage swings through the network.

2. The method of claim 1, wherein the determining the propagation delay of the EM field across the wires of the network comprises:
    determining a total wire length of the network; and
    dividing the total wire length of the network by the speed of light in a chip dielectric.

3. The method of claim 1, wherein the determining the propagation delay of the EM field across the wires of the network assumes that the EM field will propagate through the network at the speed of light in a chip dielectric.

4. The method of claim 1, wherein the RC delay of the network is calculated by building a parasitic model of capacitors and resistors of the network.

5. The method of claim 1, wherein the total time to propagate voltage swings through the network at 1/e voltage is determined according to the equation $$\text{Delay at } 1/e \text{ voltage} = RC + (\text{length of wire})/c,$$

wherein R is resistance, C is capacitance and c is the speed of light in a chip dielectric.

6. The method of claim 1, wherein the total time to propagate voltage swings through the network at ½ voltage is determined according to the equation $$\text{Delay at } \tfrac{1}{2} \text{ voltage} = 0.7 \times (RC + (\text{length of wire})/c),$$

wherein R is resistance, C is capacitance and c is the speed of light in a chip dielectric.

7. The method of claim 1, wherein if the determining indicates the estimated inductance delay should not be added to the RC delay, the inductance delay is ignored in determining the total time to propagate voltage swings through the network.

8. The method of claim 1, wherein the determining if the estimated inductance delay should be added to the RC delay comprises using at least one of an RC delay filter and a wire length filter.

9. A method of estimating an inductance delay comprising:
    determining a resistance-capacitance (RC) delay with resistances and capacitances of a network by building a parasitic model of capacitors and resistors of the network;
    estimating an inductance delay of the network by determining a propagation delay of an electromagnetic (EM) field across wires of the network by determining a total wire length of the network and dividing the total wire length of the network by the speed of light in a chip dielectric;
    determining if the estimated inductance delay should be added to the RC delay; and
    if the determining indicates the estimated inductance delay should be added to the RC delay, adding the estimated inductance delay to the RC delay to determine a total time to propagate voltage swings through the network according to one of the equations:

$$\text{Delay at } 1/e \text{ voltage} = RC + (\text{length of wire})/c, \text{ and}$$

$$\text{Delay at } \tfrac{1}{2} \text{ voltage} = 0.7 \times (RC + (\text{length of wire})/c),$$

wherein R is resistance, C is capacitance and c is the speed of light in the chip dielectric.

* * * * *